May 26, 1942.  F. M. THOMAS  2,284,180
SECURING DEVICE, PARTICULARLY FOR SUCH PARTS AS
AIRCRAFT COWLINGS AND THE LIKE
Filed April 17, 1939

INVENTOR,
FREDERICK M. THOMAS,
BY Charles L. Reynolds
ATTORNEY

Patented May 26, 1942

2,284,180

UNITED STATES PATENT OFFICE 2,284,180

SECURING DEVICE, PARTICULARLY FOR SUCH PARTS AS AIRCRAFT COWLINGS AND THE LIKE

Frederick Metcalf Thomas, Hertfordshire, England, assignor to The De Havilland Aircraft Company Limited, Hatfield Aerodrome, England Application April 17, 1939, Serial No. 268,444
In Great Britain April 27, 1938

8 Claims. (Cl. 287—119)

This invention relates to securing devices, and it is deemed to be more particularly applicable to the securing of such parts as aircraft cowlings, airscrew spinners, fairings or the like, where components or panels are to be secured in circumstances where they are subjected to vibration, and the securing is to be unaffected or even improved thereby. The invention relates to that kind of securing device in which one part to be secured to a second, has a projecting pin or equivalent to engage a socket or hole of the second part, and the second part is furnished with means for engaging and holding the pin firmly engaged in the socket.

An object of the invention is to afford securing means which are, if affected by vibration, advantageously affected. A further object is to afford securing means which may be so provided, for example in spinners of airscrews, that loads between the two parts may enhance the securing.

A further object is to provide such securing means by which interattachment results from merely mating the elements.

A further object is to provide securing means by which interattachment may be made dependent on the completion of a manual operation.

Another object is to provide securing means for use in rotating structures, in which centrifugal force enhances the security.

Finally, the invention seeks to provide effective and practical securing means for airscrew spinners, and a spinner improved by the provision thereof.

Figure 1:
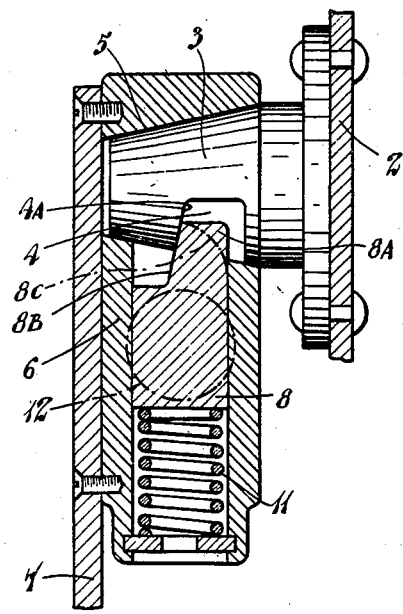
Figure 2:
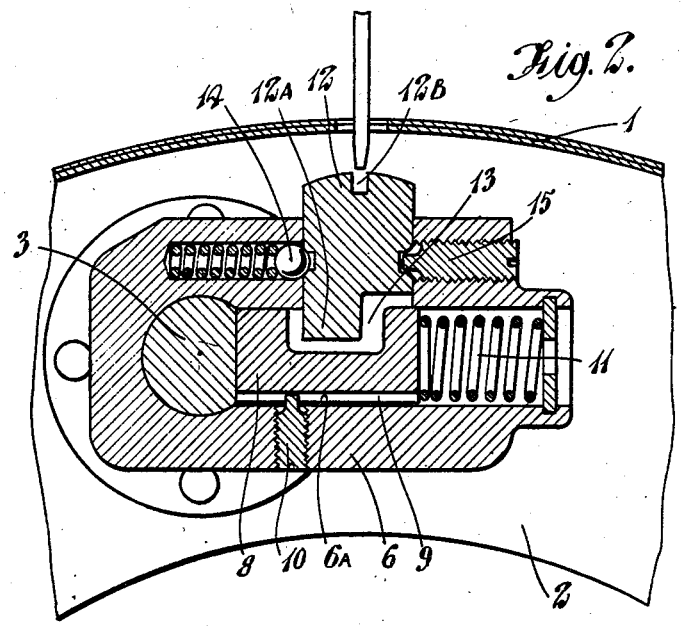

The invention will be described with reference to the accompanying drawing, in which:

Figure 1 is a partly sectional side elevation showing the securing device as it is applied to an airscrew spinner; and Figure 2 is a sectional elevation in the axial direction of the spinner.

In the following description only one securing device is referred to; it is to be understood that where the invention is applied to airscrew spinners a plurality of the devices will be employed distributed in an appropriate manner around the spinner. Part of the spinner itself is shown at 1, and within its skirt there is secured a reinforcing and attachment ring 2 which presents an inwardly radially extending flange, as shown. To the flange is secured a frustro-conical pin 3 which has a lateral recess 4 with an inclined surface 4A. The pin 3 is designed to fit into a socket the wall of which is at 5 in a body 6 which is in turn secured to an annular plate 7 or a spider or the like which is connected to the airscrew or its hub or shaft. In general terms, the spinner 1 and ring 2 constitute the first part to be secured, whilst the body 6 and plate 7 constitute the second part.

In the body 6 which has a bore for the purpose at 6A, is slidably carried a detent 8 which has at one end the tongue 8A with a surface 8B which is preferably inclined complementarily to, and to co-operate with, the surface 4A when the tongue 8A enters the recess 4. The detent 8 is guided and prevented from rotational displacement by the end of a grub screw 10 engaging in a longitudinal groove 9 of the detent 8. The detent 8 is urged towards the socket 5 by a compression spring 11 housed and secured in the body 6.

A rotatable operating element or button 12 is borne in the wall of the body 6 and its inner end is formed so as to present a cam-like or eccentric projection 12A in a recess 13 formed in the detent 8. A notch 12B enables a screwdriver or like tool to be used to rotate the element 12, and, again housed in the body 6 in a comparatively narrow bore which is parallel with the bore for the element 8, are locating means for the body 12; these means comprise a spring-urged click ball 14 adapted to engage one or more dimples or recesses in the element 12, and a set screw 15 the end of which engages a peripheral groove of the element 12, preventing axial shifting of the element 12. If necessary for access, an opening is formed in the spinner 1 for the introduction of a screw-driver or the like to engage the notch 12B.

It will be observed that the centrifugal force of the detent 8 has a small component tending to urge the surfaces 4A and 8B together so that centrifugal force tends always to tighten the pin 3 in the socket 5, because of the position of the c. g. of the detent between the pin 3 and a radius through the axis of rotation which is normal to the detent's path of movement toward the pin. The pin 3 being in effect a rearward axial projection from the spinner 1, further tends to be thrust into the socket 5 by the axial load on the spinner 1 produced aerodynamically, assuming the spinner to be travelling from left to right in Figure 1.

In order to detach the spinner the operating elements 12 are partially rotated, whereupon the parts 12A thereof engage a wall of the recess 13, and move the detents 8 to the right (in Figure 2) against the springs 11, freeing the pins 3. Upon reattachment of the spinner the elements 12 are further or oppositely rotated. In the example as illustrated, wherein the width of the recess 13 exceeds the width of the cam 12A, this simply results in the freeing of the detent 8 so that only the spring influence urges the tongue 8A into the recess 4. However, the parts may be so formed and proportioned that the part 12A can actually force the tongue 8A into the recess. As is clearly shown in the drawing, end clearance is left between the tongue 8A and the end wall of the socket 4, so as to ensure that the surfaces 4A and 8B always firmly contact, whereby it is further ensured that there is always a resultant force acting axially on the pin 3 tending to draw it tightly into the socket 5. Since the element 8 is urged towards the recess 4 by the spring 11, any vibration tends to enhance the locking and tightening action of the securing means.

There is indicated in dotted line at 8C, how the nose 8A of the detent may be formed with a second inclination such that, if the nose is projecting into the socket and the pin 3 thereafter be inserted into the socket, the detent will first be urged backwards against its spring 11, and when the pin 3 is nearly home will spring forward again into engagement with the recess 4A, whereafter the locking is positive. By suitably arranging the clearances such as 13 between the detent and the operating element, this automatic engagement may be used as an alternative to the manual operation of rotating the operating element. The so-called "resilient" load on the detent may be afforded by spring, gravity, fluid pressure, centrifugal force, or any combination thereof.

What I claim is:

1. Means for securing together two separable members, comprising a tapered pin, having a lateral recess in its tapered portion, carried by one member and a complementally tapered socket in the other member for lateral pin and socket wedging engagement by endwise movement of the pin limited solely by such wedging action, said tapered pin and socket being formed for mutual engagement lengthwise on both sides of such recess, a detent guided for lengthwise movement of its end into the pin's socket transversely thereof and having a surface on such end inclined relative to the direction of movement of the detent and formed complementally to the surface of the pin's lateral recess next to the pin's tapered end, for contiguous, unilateral, wedging engagement of such surfaces tending to force said pin farther into its socket by endwise movement of the detent, such pin's lateral recess being of such a width and depth as to maintain its bottom and opposite side surface always spaced from said detent while retaining said pin and socket in wedging socket, and a spring urging said detent endwise into the pin's recess, in turn to bias the pin into socket wedging engagement.

2. Means for securing together two separable members, comprising a laterally recessed pin carried by one member and a socket in the other member formed complementally for lateral pin and socket wedging engagement by endwise movement of the pin limited solely by such wedging action, a detent guided for lengthwise movement of its end into the pin's socket transversely thereof and formed complementally to said pin's lateral recess for wedging engagement therein tending to force said pin farther into its socket by endwise movement of the detent limited solely by such detent wedging action, said separable members being adapted for rotation, and said detent being inclined with respect to a radius through the axis of rotation to be urged toward pin-engaged position by centrifugal force, during such rotation, and a spring also urging said detent endwise into the pin's recess, in turn to bias the pin into socket-wedging engagement.

3. In combination with two separable members rotatable conjointly at high speed, such as an airscrew hub and a spinner, respectively, one whereof is socketed, a pin carried by the other and engageable within said socket, a detent engageable with the pin, and guided by the socketed member for movement in a fixed path between pin-engaged and pin-released positions, the several parts being relatively so arranged and organized that in pin-engaged position the detent's center of gravity is disposed between the pin and a radius through the axis of rotation which is normal to the detent's path of movement, whereby the centrifugal force which acts upon the detent per se, in pin-engaged position, creates a component urging the detent towards its pin-engaged position.

4. In combination with a rotative part and a removable part securable thereupon, such as an airscrew hub and spinner respectively, means for securing together such two parts for conjoint rotation, comprising a pin carried by one part and arranged generally parallel to the axis of rotation, and a complemental socket formed in the other part, the socketed part having a bore intersecting the socket and arranged generally tangentially with respect to the axis of rotation of the parts, a detent guided within said bore for movement towards and from the socket, the center of gravity of said detent being disposed, in pin-engaged position, between the socket and a radius which is normal to the axis of the bore, whereby the centrifugal effect urges the detent towards the socket and the pin therein, and a lateral recess formed in the pin, one wall whereof is engaged by the detent, under the influence of centrifugal force.

5. Means for securing together two separable members, comprising a pin carried by one member and a socket in the other member formed complementally for lateral pin and socket wedging engagement by endwise movement of the pin limited solely by such wedging action, said pin having a shoulder transversely of its length and facing away from its socket-received end, a detent guided for lengthwise movement of its end toward the pin transversely thereof and having one side formed complementally to said pin's shoulder for unilateral wedging engagement therewith, tending to force said pin farther into its socket by endwise movement of the detent limited solely by such detent wedging action, and means urging said detent endwise to press its side against the pin's shoulder, in turn to bias the pin into socket-wedging engagement.

6. Means for securing together two separable members, comprising a pin carried by one member and a socket in the other member formed complementally for lateral pin and socket wedging engagement by endwise movement of the pin limited solely by such wedging action, said pin having a shoulder transversely of its length and facing away from its socket-received end, a detent guided for lengthwise movement of its end toward the pin transversely thereof and having one side formed complementally to said pin's shoulder for unilateral wedging engagement therewith, tending to force said pin farther into its socket by endwise movement of the detent limited solely by such detent wedging action, means urging said detent endwise to press its side against the pin's shoulder, in turn to bias the pin into socket wedging engagement, and an actuator button mounted in the socketed member adjacent to the detent, provided with an eccentric projection to engage the detent for retraction by rotation of said button, and having its end formed for engagement by a tool to effect its rotation.

7. The combination of claim 6, and means including click locating means to restrain axial movement of the actuator button, said click locating means being operable to hold the button in either detent-retracted or detent-engaged rotative position.

8. Means for securing together two separable members, comprising a pin carried by one member, the other member having a complemental socket for wedging insertion therein of the end of said pin by endwise movement thereof, such socket being of an unobstructed depth exceeding the length of the insertible pin end, a detent guided for lengthwise movement of its end into the pin's socket transversely thereof, said pin having on its insertible end a transverse shoulder facing away from such end and formed complementally to a side of said detent projecting into the socket, for unilateral wedging engagement of such detent side with said shoulder tending to press said pin farther into its socket by endwise movement of the detent, said shoulder being of a width exceeding the length of the portion of the detent end engaged therewith in effecting wedging engagement of the pin and socket, and means urging said detent endwise to press its side against the pin's shoulder, in turn to bias the pin into socket-wedging engagement.

FREDERICK METCALF THOMAS.